Oct. 26, 1937.　　L. R. TALLMAN ET AL　　2,097,353
CUTTER ATTACHMENT FOR BALERS
Filed April 25, 1935　　2 Sheets-Sheet 1
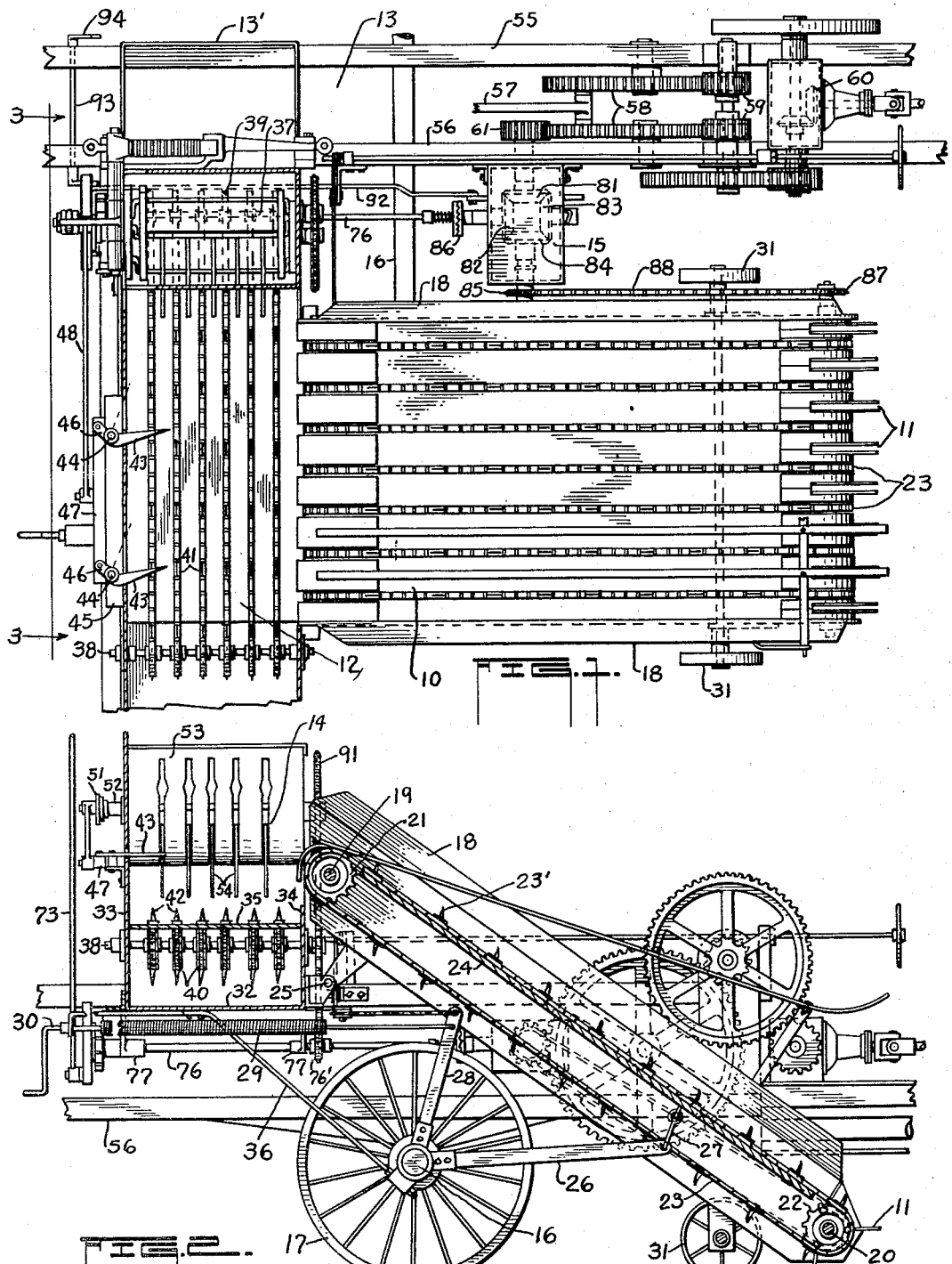
INVENTORS.
Leslie R. Tallman
Gentry L. Tallman
BY
Jefft & Jefft
ATTYS.

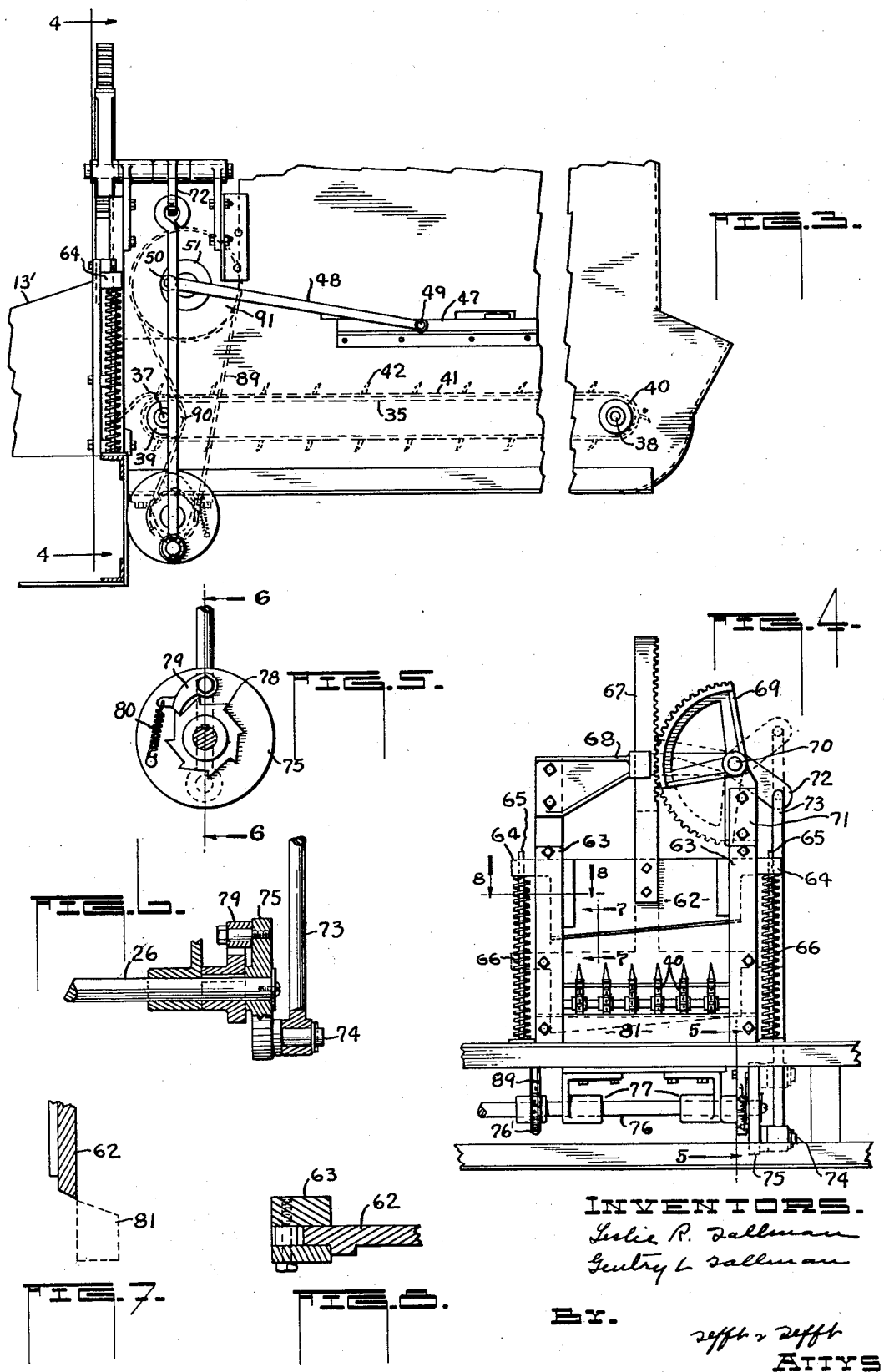

Patented Oct. 26, 1937

2,097,353

UNITED STATES PATENT OFFICE 2,097,353

CUTTER ATTACHMENT FOR BALERS

Leslie R. Tallman and Gentry L. Tallman,
Shelbyville, Ill.

Application April 25, 1935, Serial No. 18,194

4 Claims. (Cl. 100—25)

This invention has reference to a cutter attachment for portable baling machinery and has for its principal object to provide a cutter mechanism for combined pick-up and baling machines, the same being operable to shear the stream of fibres passing from the pick-up and feeding devices to the baler.

Another object is to provide a cutter mechanism as aforesaid which is automatically operated co-operatively with certain operative movements of the feeding devices.

A further object is to provide a pick-up device for gathering hay from the ground, and a conveyor to transport the same to a cross feed conveyor whereby it is transported and fed into an associated baler, means for driving the cross feed conveyor in such a manner as to transport the hay toward or away from the baler and a cutting device co-operative with the cross feed conveyor capable of severing the stream of hay when the cross feed conveyor is operated to transport the hay away from the baler.

An additional object is to provide a combined pick-up and baler mechanism which includes means for gathering hay from the ground and transporting the same to the baler in a substantially continuous stream, means for interrupting the movement of the stream and co-operative means for severing the stream for the purpose of facilitating operation in the baling process.

A further object is to provide a combined pick-up and baler mechanism as aforesaid having a cutter element adapted to facilitate handling of the hay stream being fed into the baler, the combined baler, pick-up mechanism and cutter elements being supported for transport over a field by means of a single shaft supported on a pair of wheels.

Other objects will appear in the following description and accompanying drawings in which:

Fig. 1 is a partially fragmented plan view of a pick-up baler mechanism in which my invention is embodied;

Fig. 2 is a side elevational view of the same as it would appear from below in Fig. 1;

Fig. 3 is a fragmented side elevational view showing details of mechanism to be described, the view being taken from line 3—3 in Fig. 1;

Fig. 4 is an end elevational view showing details of mechanism to be described, the same being taken from line 4—4 in Fig. 3;

Fig. 5 is a detail sectional view taken from line 5—5 in Fig. 4;

Fig. 6 is a sectional detail view taken on line 6—6 in Fig. 5;

Fig. 7 is a fragmentary sectional detail view taken on line 7—7 in Fig. 4; and

Fig. 8 is a fragmental sectional detail view taken on line 8—8 in Fig. 4.

Figs. 1 and 2 disclose the device to be described as consisting of an inclined conveyor mechanism 10, which includes pick-up devices 11, a cross feed conveyor mechanism 12 adapted to receive hay from mechanism 10 to transport the same to an associated baler mechanism 13. The cross feed conveyor mechanism includes accessory mechanism 14 for assisting the cross feed devices in ejecting hay into the baler and a cutting device for severing the ejected hay stream.

It is to be noted that the word "hay" is herein used as a convenient term to designate all fibrous plants capable of being harvested and baled and not in the limited sense as applied to the particular plant commonly known as hay.

The combination includes driving elements for the several mechanisms involved and a control mechanism 15 whereby the several elements are selectively driven and controlled as will be described, and the combined apparatus is supported for transport over a field on a unitary axle 16 mounted on suitable wheels 17, only one of which is herein shown.

Conveyor 10 comprises a unitary supporting frame structure 18 which carries rotatable upper and lower shafts 19 and 20, carrying plural sprockets 21 and 22, which in turn carry conveyor chains 23, which are provided with upstanding spike portions 23'. The upper lengths of chains 23 rest upon a platform board 24 which is supported in frame 18.

The lower shaft 20 carries, in addition to sprockets 22, a series of tine members 11 which, when rotated, act to pick up hay from the ground as the apparatus is moved through the field and deliver the gathered hay to the conveyor.

The conveyor structure is supported at its upper end by means of pivotal attachment at 25 with the frame structure of conveyor 12 and its lower end is principally supported by means of an arm 26 extending from axle 16 and connected with the supporting frame structure by a short link 27. Another arm, 28, is attached to the hub structure carrying arm 26 and to the free end of this is attached a spring 29, the opposite end of which is anchored, as by means of a rod 30 in the frame structure of conveyor 12.

It will be apparent that the spring 29 is adapted to exert a pulling force upon arm 28 whereby the outboard weight of conveyor 10 is more or less counterbalanced.

31 designates ground wheels which are mounted upon the frame structure 10 and so disposed with respect to the pick-up elements as to space them properly with respect to the ground, thus enabling the pick-up to operate in close proximity to the ground without actual engagement therewith.

As above noted, the spring 29 is effective to support the outboard weight of the structure, and in practice the strength of the spring is made such that the ground wheels 31 carry only a small portion of the weight, only enough in fact to insure firm contact of the ground wheels with the surface of the field, whereby the contour of the ground is followed with fidelity and the pick-up mechanism is at all times in proper position with respect to the surface over which it is traveling.

The cross feed conveyor mechanism comprises a frame structure which includes a bottom member 32 and side members 33 and 34. Secured between the latter is a floor board structure 35.

The frame structure is supported at its inner end upon the baler frame structure and at its outer end by means of a brace member 36 which is carried by the shaft 16 as shown in Fig. 2.

In opposite ends of the frame structure are rotatable shafts 37 and 38 which carry plural sprockets 39 and 40. The sprockets carry chains 41, the upper lengths of which are supported by and slide upon the floor board 35. The chains are provided with spike or tooth portions 42 whereby the hay falling thereon is efficiently transported in the direction of travel of the chain.

The cross feed mechanism also includes a forking device adapted to assist the chains 42 in diverting and propelling the hay stream discharged from the pick-up conveyor. This device comprises a pair of pointed members 43 disposed above the chains 41 as shown in Fig. 2.

The members are mounted to rock in a horizontal plane by means of pivotal attachment at 44 to a bar member 45.

Members 43 have rearwardly extending arms 46 which are pivotally attached to a second bar member 47. It will be apparent that bar 47 is supported upon extensions 46 which are in turn supported upon bar 45, and the mechanism is so proportioned and arranged that bar 47 may be moved longitudinally to swing upon arms 46 whereby the pointed members 43 are caused to rock unitarily upon pivots 44.

The bar 45 is slidably mounted on the frame structure 33. Figs. 1, 2, and 3 illustrate a pitman 48 which is pivotally connected at 49 to the bar 47 and to an offset stud 50 carried by a disk 51. The disk is secured to a shaft 52 which is rotatably mounted in the frame structure. By means of rotation of the disk 51, reciprocal movement is imparted to the bar 47, and the initial movement at each end of its stroke causes rocking movement of members 43. The arrangement and proportions of extensions 46 are such that the longitudinal movement of bar 47 with respect to bar 45 is limited, and during a full stroke of pitman 48 the reversing movement at each end first rocks members 43 to position them open as shown in solid lines, or on the opposite end, to position them closed as indicated in dotted lines. During the intermediate portion of the stroke, the bar 45 is obviously carried along with bar 47 to propel members 43 forwardly or backwardly with respect to the baler, the forward stroke being made with members 43 in open position and the backward stroke with the members closed. By the movement described the members are obviously made effective to fork the hay toward the baler. Means for driving the mechanism will be noted later.

As shown best in Figs. 2 and 3, the cross feed conveyor mechanism includes a baffle structure 53 which includes movable tine members 54. This mechanism is not a necessary part of the present invention. It is fully disclosed in a copending application, Serial Number 752,194, filed November 9, 1934 now matured into Patent No. 2,038,809, dated April 28, 1936, and will not be described herein further than to say that it is adapted to assist the chain mechanism in ejecting hay into the baler.

At the inner end of the cross feed conveyor there is disposed a cutter mechanism which will be described shortly.

The baler mechanism, herein shown in fragmental manner, comprises the conventional side frame members 55 and 56 which are supported upon shaft 16. It is to be noted that shaft 16 carries the entire apparatus herein described, including the baler and accessorial pick-up and conveyor devices.

Mechanism of conventional baler apparatus are thought sufficiently well known as to obviate detail description herein further than to note that the plunger head, not shown, is operated through a pitman 57 which is eccentrically connected between a pair of gears 58 as shown.

Gears 58 are driven by pinions 59 which in turn may be driven by a power take-off mechanism, designated 60, operated from an associated tractor or from an independent power plant carried upon the baler frame. The baler frame carries a side board structure 13' disposed adjacent the inner end of the cross feed conveyor and over the baler in such position as to facilitate passage of hay from the conveyor to the baler.

Meshed with one of gears 58 is a pinion 61, and this pinion has driving connection with a gear and clutching mechanism included in the control mechanism 15, to drive the several elements of the apparatus as will be described.

The cutter device above noted comprises a guillotine knife 62 mounted for vertical movement in guide members 63 which are supported upon the baler frame or the inner end of the cross feed conveyor frame structure.

Knife 62 has extending end portions 64 which have apertures adapted to receive vertical rods 65 upon which are confined coil springs 66. The springs are of such strength as to be capable of forcing the knife 62 into the elevated position in which it is shown in Fig. 4. The knife is provided with an upright rack member 67 which is slidably supported by a bracket fixture 68 attached to one of the members 63.

Meshing with rack 67 is a gear segment 69 rockably mounted at 70 upon a bracket fixture 71 attached to one of members 63.

Segment 69 has a rearwardly directed arm 72 to which is connected a bar 73 having its opposite end connected upon a stud 74 eccentrically disposed upon a disk member 75. The disk is rotatably confined on a shaft 76, which also carries a sprocket 76'.

Shaft 76 is journalled in bearing brackets 77 supported upon the frame structure and carries a ratchet 78, Fig. 5, which lies adjacent the disk 75 as shown in Fig. 6.

Disk 75 carries a pawl 79, tensioned by a spring 80 toward engagement with the teeth of ratchet 78.

Mounted between the lower ends of guides 63 is a horizontally disposed knife 81 positioned to co-operate with knife 62 in forming a shearing mechanism when the latter knife is lowered to the position shown in dotted lines in Fig. 4 and diagrammatically in Fig. 7. The cutting edge of knife 62 lies upon a diagonal line whereby the shearing action is facilitated.

By means which are to be explained, the shaft 76 may be rotated in reverse directions. It will be apparent that through the ratchet mechanism described the shaft, rotating in one direction will have its movement imparted to disk 75 through the pawl 79 whereby the segment 69 will be operated to cause reciprocal movement of knife 62, whereas when the shaft is rotated in opposite direction there will be no driving connection through the pawl 79 and knife 62 will not be moved. The action of springs 66 to normally hold the knife in elevated position has already been noted and it will thus be apparent that when shaft 76 is rotated in one direction the knife is operated, and when rotated in opposite direction the knife is stationarily held in elevated position.

The function of pinion 61 has already been noted.

The pinion is mounted upon a shaft which extends into the housing of mechanism 15 and within the housing is a clutch and change gear mechanism to be driven by the pinion.

Mechanism of the type used are thought sufficiently well known to require but brief description. Dotted lines in Fig. 1 indicate four mitre gears 81, 82, 83, and 84.

Gear 81 is driven by pinion 61, gears 82 and 83 mesh with gear 81 and are to be driven thereby, and gear 84 is driven by gears 82 and 83.

Gear 82 is connected to the shaft line 76 through a breakable connection 86, and gear 84 is arranged to drive a sprocket 85 which has driving connection with a sprocket 87 through a chain 88. Sprocket 87 is secured to shaft 20.

A chain 89, driven by sprocket 76' secured to shaft 76, is arranged to engage a sprocket 90 which is secured to shaft 37 of the cross feed conveyor and an upper sprocket 91 affixed to shaft 52.

The control mechanism described also includes clutching devices which are considered conventional and are not shown, and the clutching devices are made manually operable from a remote station on the opposite side of the baler, through connection of a bar 92 and a shaft 93 with a hand lever 94.

By means of the hand lever the clutching devices may be operated to establish driving connection between shaft 76 and a selected one of gears 82 or 83 whereby to optionally rotate shaft 76 in either direction.

It will now become apparent that the apparatus above described may be drawn over a field with the baler mechanism in operation whereby the pick-up members 11 are operated to lift hay from the ground and place it upon conveyor 10 whereby it is elevated and discharged into conveyor 12. The chains 41, with the assistance of members 43, divert and transport the hay stream into the baler, ejection of the stream being assisted by tines 54 which are operated by shaft 52.

The rotative direction of shaft 76 is arranged to be such that the forward or feeding movement of the hay stream is brought about by rotation which is ineffective to operate the knife 62.

During usual baling operations it becomes necessary at certain times to insert blocks in the baler for the purpose of separating the bales. At such times it is necessary to break the stream of material being fed into the baler and to separate that portion of the material in the stream moving toward the baler from that already in the baler. It is obviously desirable that the separation be made quickly and sharply.

To provide for such separation we arrange the cross feed conveyor so that its direction of travel may be reversed whereby the stream is caused to move away from the baler and when this reverse movement is established the stream entering the baler is obviously interrupted.

However, due to the fibrous nature of some grain stalks, complete separation of the stream is often difficult of accomplishment. The stalks become interwoven in such a manner that the stream may become comparable with a loosely made rope and the combined strength of the fibres may be such that no ordinary pulling effort is sufficient to break the stream.

To insure perfect separation of the stream, we provide the cutter mechanism described.

It has already been noted that shaft 76, when rotated in one direction, drives the cross-feed conveyor in forward direction, and this rotation of the shaft corresponds to the inactive disposition of knife 62.

When the shaft is rotated in the opposite direction to reverse the direction of travel of the stream as above noted the knife is automatically placed in operation, whereby the stream while being separated is sharply severed and thus undesired and troublesome pulling is obviated.

Upon re-establishment of usual rotation of shaft 76, knife 62 is automatically rendered inactive and elevated as described by springs 66.

The foregoing will make clear that we have provided a device which is capable of rendering great assistance in the work of continuously gathering and baling hay in the field.

Modifications of structure are obviously possible without alteration of the principle involved. We do not wish to be limited in structure or principle, except within the scope of the appended claims.

What we claim is:

1. A device of the class described having in combination a conveyor adapted to transport hay into an associated baler, mechanism for operating said conveyor in reverse directions whereby the hay may be transported toward or away from the baler and a shears cutter operable by said mechanism to cut the hay, said latter mechanism being operable only when the hay is being transported away from the baler.

2. A device of the class described having in combination a pick-up conveyor, a cross feed conveyor and a baler, said conveyors being adapted to transport hay from the ground to the baler in a substantially continuous stream, the cross feed conveyor adapted to propel said stream toward the baler to discharge the hay thereinto or away from the baler, and a reciprocal shears cutter operable to sever the stream at the moment of reversal of the direction of travel of the stream.

3. A device of the class described, including in combination a cross feed conveyor, means driving the same in forward direction toward a baler or in reverse direction, a crank connected with said driving means, ratchet mechanism disposed between the driving means and crank operable to turn the crank in unison with the driving means when the latter operates in reverse direction and being inoperable to turn the crank when the driving means operates in forward direction, a shears cutter disposed at the forward end of said conveyor and connection between said cutter and crank causing the shears cutter to reciprocate when said crank is turned, said cutter being capable of cutting a stream of hay carried by the conveyor, whereby when said conveyor is operated in forward direction discharging hay into a baler the cutter is inoperative and when the conveyor is reversed the cutter is actuated to sever the stream to prevent hay already discharged from being drawn back into the conveyor.

4. In a pick up baler, the combination of a pick up conveyor, a cross feed conveyor, mechanism to drive said feed conveyor in a forward or reverse direction and a reciprocating shear cutter mechanism coacting and driven from said feed conveyor mechanism to operate only when said conveyor mechanism is driving the conveyor in reverse direction.

LESLIE R. TALLMAN.
GENTRY L. TALLMAN.